(12) United States Patent
van den Hengel et al.

(10) Patent No.: US 8,896,706 B2
(45) Date of Patent: Nov. 25, 2014

(54) COLOUR CALIBRATION METHOD FOR AN IMAGE CAPTURE DEVICE

(75) Inventors: Anton John van den Hengel, Adelaide (AU); Rhys Ernst Hill, Adelaide (AU)

(73) Assignee: LBT Innovations, Limited, Adelaide, South Australia (AU)

( * ) Notice: Subject to any disclaimer, the term of this patent is extended or adjusted under 35 U.S.C. 154(b) by 0 days.

(21) Appl. No.: 14/002,676

(22) PCT Filed: Mar. 2, 2012

(86) PCT No.: PCT/AU2012/000208
§ 371 (c)(1),
(2), (4) Date: Apr. 4, 2014

(87) PCT Pub. No.: WO2012/119189
PCT Pub. Date: Sep. 13, 2012

(65) Prior Publication Data
US 2014/0204239 A1     Jul. 24, 2014

(30) Foreign Application Priority Data

Mar. 4, 2011 (AU) .............................. 2011900785

(51) Int. Cl.
*H04N 17/02* (2006.01)
*H04N 9/68* (2006.01)
*H04N 9/64* (2006.01)
*H04N 9/73* (2006.01)
*H04N 5/57* (2006.01)

(52) U.S. Cl.
CPC ............... *H04N 9/643* (2013.01); *H04N 9/735* (2013.01)
USPC ........... 348/188; 348/645; 348/649; 348/655; 348/687

(58) Field of Classification Search
USPC ........... 348/188, 187, 180, 182, 223.1, 225.1, 348/256, 645–647, 649–651, 655, 687, 348/703; 358/518, 516, 520, 525; 382/167
IPC ................. H04N 17/00,17/02, 9/73, 9/64, 9/68, H04N 5/57
See application file for complete search history.

(56) References Cited

U.S. PATENT DOCUMENTS

| | | | |
|---|---|---|---|
| 4,959,711 | A | 9/1990 | Hung et al. |
| 5,483,259 | A | 1/1996 | Sachs |
| 6,995,865 | B1 | 2/2006 | Motomura |

(Continued)

OTHER PUBLICATIONS

WIPO, Australian International Search Authority, International Search Report mailed Apr. 3, 2012 in International Patent Application No. PCT/AU2012/000208, 3 pages.

*Primary Examiner* — Sherrie Hsia
(74) *Attorney, Agent, or Firm* — Inskeep IP Group, Inc.

(57) ABSTRACT

A method for providing a mapping from apparent color to actual color for an image capture device including capturing an image of a reference color chart having a plurality of color patches using the image capture device, wherein each color patch has an associated reference color, measuring the apparent color of the plurality of color patches in the captured image, selecting a plurality of control points representing different hue values within a circular hue space, determining an angular offset for each control point such that the distance between a transformed apparent color and the reference color for each color patch is minimized, the angular offset representing a hue correction, wherein interpolation of the angular offsets for the control points provides a mapping from apparent color to actual color for the image capture device.

13 Claims, 7 Drawing Sheets

(56) References Cited

U.S. PATENT DOCUMENTS

| | | | |
|---|---|---|---|
| 2003/0164968 A1* | 9/2003 | Iida | 358/1.9 |
| 2004/0141642 A1 | 7/2004 | Zeng et al. | |
| 2009/0046171 A1* | 2/2009 | Kogan et al. | 348/223.1 |
| 2009/0060326 A1* | 3/2009 | Imai et al. | 382/167 |

* cited by examiner

COLOUR CALIBRATION METHOD FOR AN IMAGE CAPTURE DEVICE

RELATED APPLICATIONS

This application claims priority to and is the U.S. National Phase of international patent application number PCT/AU2012/000208, International Filing Date 2 Mar. 2012, entitled Colour Calibration Method For An Image Capture Device, which claims priority to Australian Provisional Patent Application No. 2011900785 filed on 4 Mar. 2011, entitled Colour Calibration Method For An Image Capture Device, both of which are incorporated herein by reference in their entireties.

FIELD OF THE INVENTION

The present invention relates to methods and software for providing a mapping from apparent colour to actual colour for an image capture device, and methods and software for using the mapping in colour calibrating images captured by the device.

BACKGROUND TO THE INVENTION

A digital camera, in an existing example, captures an image using a sensor such as a charge-coupled device (CCD) or a Complementary Metal-Oxide Semiconductor (CMOS) sensor. Most of these camera sensors can read only one colour at each physical location, returning raw data as a pattern of values from each channel in a particular colour space, for instance red, green and blue (RGB), for each position or pixel in the image. For example, each R, G and B value may be represented as a number between 0 and a defined maximum such as 255, and the combination of RGB values at a pixel represents a particular colour.

The camera captures RGB values by reference to a camera colour space. However, it is rare for the camera colour space to exactly match a known reference colour space. Thus there is a difference between the "apparent colour" that a camera interprets as e.g. R=120, G=110, B=105 and the "actual colour" e.g. R=100, G=100, B=100 in a reference colour space. Therefore, colour calibration methods are needed to map apparent colour as captured by the camera to actual colour in a reference colour space. This ensures that two different devices capturing images of the same physical object report the same actual colour values. Further, lighting effects can have a very significant effect of the observed colour of an object. Most lights are not pure white, due to innate physical properties of the lights themselves, which then causes measured colours to differ from true colour.

Colour mapping is usually performed as a combination of linear and non-linear transformations of the apparent colour to actual colour by, for example, multiplication of the colour vector via an appropriate matrix and passing the individual colour values through a polynomial.

Computing such a transform is a difficult process, and requires a large number of colour samples, and preferably knowledge of the camera sensor itself. Such a technique is difficult to apply in some situations where space or time constraints render such a process impractical. Simple colour correction, such as white balance correction, is sufficient in some applications with such space or time constraints; however in some applications a higher accuracy mapping is required.

It is an aim of the present invention to provide a mapping for an image capture device that addresses one or more of the limitations of existing colour mapping methods.

The above discussion of background art is included to explain the context of the present invention. It is not to be taken as an admission that any of the documents or other material referred to was published, known or part of the common general knowledge at the priority date of any one of the claims of this specification.

SUMMARY OF THE INVENTION

The present invention provides a method for providing a mapping from apparent colour to actual colour for an image capture device including:
  capturing an image of a reference colour chart having a plurality of colour patches using the image capture device, wherein each colour patch has an associated reference colour,
  measuring the apparent colour of the plurality of colour patches in the captured image,
  selecting a plurality of control points representing different hue values within a circular hue space,
  determining an angular offset for each control point such that the distance between a transformed apparent colour and the reference colour for each colour patch is minimised, the angular offset representing a hue correction,
  wherein interpolation of the angular offsets for the control points provides a mapping from apparent colour to actual colour for the image capture device.

For example, images used for microbiological assessment purposes, such as identifying microbial growth (e.g. bacterial colonies) grown on a solid culture medium, must be accurate as the colour, shape and texture of bacterial colonies and the colour of the solid culture medium (such as agar) are used in identifying the bacterial type. Therefore, in the example, it will be appreciated by those persons skilled in the art that it is important that the colour of an image is close to actual colour. It will also be appreciated by those persons skilled in the art that mapping from apparent colour to actual colour for captured images can be used in respect of other applications, such as high-end photography.

The apparent colour and reference colour (input colours) may be measured in any colour space, for example RGB, YUV, LAB, XYZ. The mapping to actual colour (output colour) may transform the apparent colour to the same colour space, or it may transform the apparent colour to a different colour space. The distance between the transformed apparent colour and the reference colour may be measured in the input or output colour space.

The hue value of a control point refers to the hue value in the HSV (hue saturation value) colour space. The HSV space is used as an intermediary between the input and output spaces. This colour space is represented by a cone, with the angle around the central vertical axis corresponding to hue, the distance from the vertical axis corresponding to saturation, and the distance along the vertical axis corresponding to value (brightness). The circular hue space refers to a circular cross section of the HSV cone.

The method is able to produce a mapping from a small number of reference colours. For example, a mapping produced using 24 colour patches has been found to produce a sufficient calibration for use in imaging bacterial colonies to a sufficient accuracy for microbiological assessment purposes. The number of required patches depends on the fidelity of the mapping that is required, and is adjustable. An image that has been colour corrected using the mapping may be used in training a machine learning algorithm to classify the bacterial colonies, for example as described in the co-pending International patent application of the same Applicant and with the same filing date titled "Method and Software for Analysing Microbial Growth"; the contents of which are herein incorporated by reference.

The angular offsets of the control points may be used to map an apparent hue to an actual hue of a pixel in any other image taken by the same image capture device under the same lighting conditions, by interpolating between the angular offsets for the control points to determine an interpolated angular offset for the apparent hue of the pixel in the image. The interpolated angular offset is then applied to the apparent hue to achieve an approximation of the actual hue (and therefore actual colour). By applying a transform in a circular hue space, the method of the present invention may provide a more accurate approximation than a straightforward linear transformation of the original colour values. It is to be understood by those persons skilled in the art that references to "actual colour" does not require that the apparent colour be mapped perfectly to the reference colour space. Rather, the mapping provides an approximation of the actual colour.

The image capture device may be a digital camera, such as a high resolution colour digital camera, digital scanner or digital video camera.

Turning now to the selection of control points, the plurality of control points may be evenly spaced around the circular hue space. The angular position of the control point on the circular hue space represents its hue value. For example, the control points may form a single ring around the space, with a uniform distance between adjacent control points in the ring. Selecting the positions for the control points may include computing an error for a series of candidate mappings using different numbers of control points, and selecting a mapping from the series based on the minimal number of points yielding an acceptable error. It will be appreciated that is desirable to select as few control points as possible, in the interests of computational efficiency and estimation accuracy.

Measuring the apparent colour of a colour patch in the image captured by the image capture device may further include: measuring a colour of a colour patch, white balance correcting the measured colour, brightness correcting the measured colour, and determining the apparent colour using the resulting white balance and brightness corrected colour. The white balance correction may be done using a weighting determined from a neutral grey patch in the colour chart, where the R, G and B values should be equal. The brightness may be corrected using a curve computed using a plurality of grey patches in the colour chart which have known brightness. Thus, the colour mapping is performed with data that has been corrected for white balance and brightness. This reduces the complexity of the transformation and thus the computation time required compared with producing a mapping that accounts for white balance and brightness.

Determining the angular offset for each control point such that the distance between a transformed apparent colour and the reference colour for each colour patch is minimised may include minimising a cost function that includes the sum of the squares of the distance between the transformed apparent colour and the reference colour for each colour patch. The cost function may further include the sum of the squares of the angular offsets.

In an embodiment, the method may further include determining a scale for each control point such that the distance between a transformed apparent colour and the reference colour for each colour patch is minimised, the scale representing a saturation correction, wherein interpolation of the scales for the control points provide a further mapping from apparent colour to actual colour for the image capture device.

The interpolated scale for the apparent saturation is applied to the apparent saturation to obtain an approximation of the actual saturation. The control points may represent hue values that are nearest to the position of the apparent hue and saturation of the colour patch in the circular hue space. The control points may include one or two (or more) rings of control points around the circular hue space, each ring having a different saturation value. In one example, two rings of control points are used, with control points in each ring having the same hue but different saturation values, such as 0.5 and 1. The control points of course need not be in rings, and could be spaced in another arrangement around the circular hue space.

As above, determining the scale for each control point such that the distance between a transformed apparent colour and the reference colour for each colour patch is minimised may include minimising a cost function that includes the sum of the squares of the distance between the transformed apparent colour and the reference colour for each colour patch. The cost function may further include the sum of the squares of one minus each saturation scale to encourage final scales around one.

Alternatively, saturation could be mapped using a curve similar to the brightness curve, rather than simply scaling it.

To apply the mapping, the method may include: capturing an image using the image capture device, for one or more pixels in the image; determining the apparent hue of the pixel; interpolating between the angular offsets of two or more control points in the circular hue space to determine an angular offset associated with the apparent hue; and applying the angular offset to the apparent hue. The method may further include for the one or more pixels in the image: determining the apparent saturation of the pixel; interpolating between the scales of the two or more control points in the circular hue space to determine a scale associated with the apparent saturation; and applying the scale to the apparent saturation.

The two or more control points may represent hue values that are nearest to the apparent hue in the circular hue space. This has been found, in exemplary embodiments, to produce a satisfactory mapping. Preferably four control points and cubic interpolation is used. Alternatively, the angular offsets may be transformed using a higher order interpolation method. However, in this case a greater amount of processing would be required to determine the optimised angular offsets. Linear interpolation could alternatively be used, but it would be less smooth, and would produce discontinuities in the colour space when crossing over a control point.

Once the apparent hue and saturation for a pixel is determined, the colour may be converted to any appropriate colour space e.g. for display.

In addition, the present invention provides software for use with a computer including a processor and memory for storing the software, the software including a series of instructions executable by the processor to carry out the method in accordance with any one of the embodiments described above.

The present invention also extends to a computer readable media including the software, and apparatus including a processor, a memory and software resident in memory accessible to the processor, the software executable by the processor to carry out the method in accordance with any one of the embodiments described above.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

DETAILED DESCRIPTION OF AN EMBODIMENT

Figure 1:
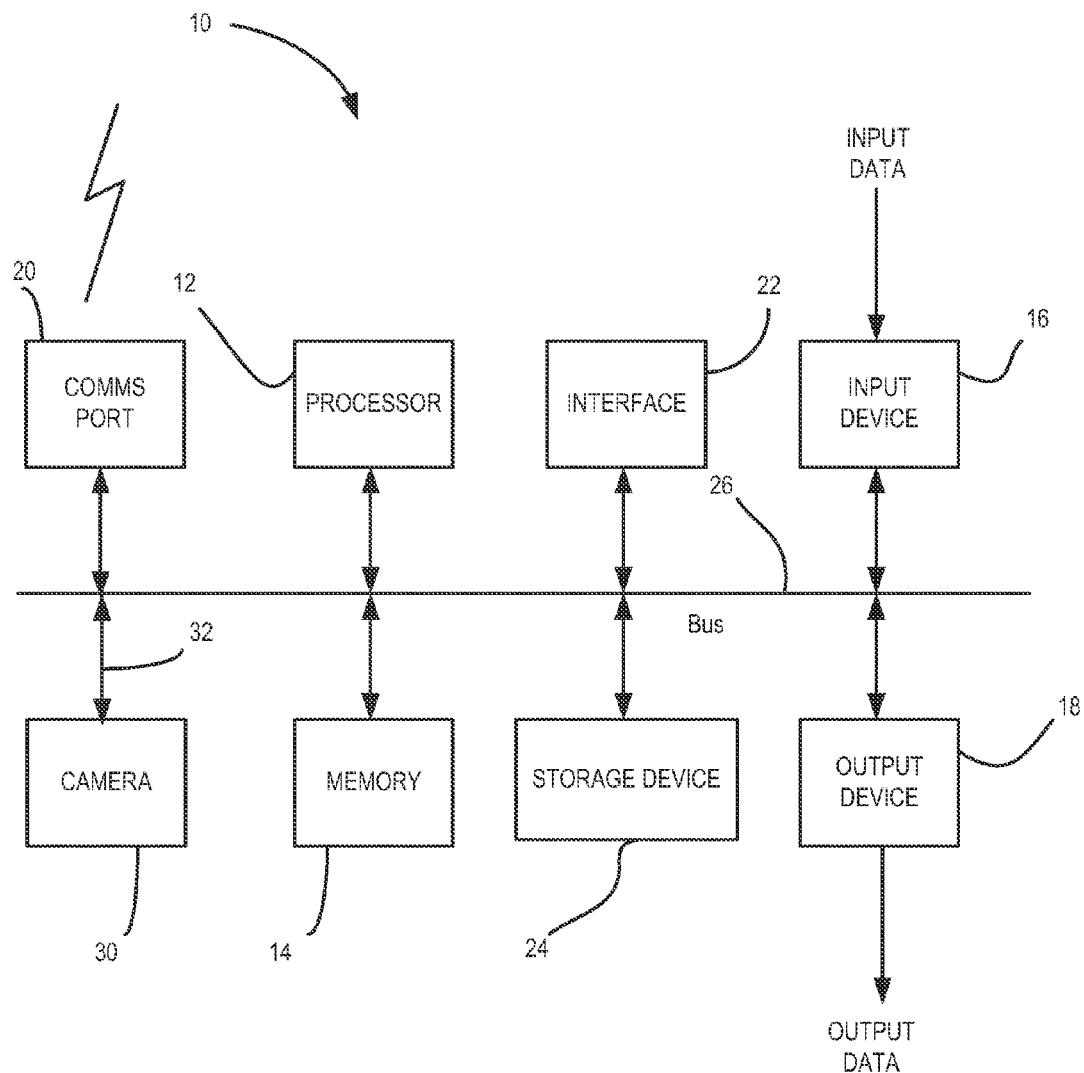
FIG. 1 is an example processing system and image capture device for performing methods according to embodiments of the invention.

An example processing system and image capture device for use with embodiments of the invention will be described with reference to FIG. 1. The processing system 10 includes a processor 12, a memory 14, at least one input device 16, at least one output device 18, a communications port 20, an interface 22 and a storage device 24. As is shown, the components of the processing system 10 are coupled together via a bus or group of buses 26.

The processor 12 may include more than one processing device, for example to handle different functions within the processing system 10. The memory 14 may include any suitable memory device and including, for example, volatile or non-volatile memory, solid state storage devices, magnetic devices, etc. The memory 14 may store instructions for execution by the processor 12.

Input device 16 receives input data and may include, for example, a keyboard, a mouse or other pointer device, a trackball, joystick or touch-screen, a microphone, a data receiver or antenna such as a modem or wireless data adaptor, data acquisition card, etc. An input device 16 may be operable by a user to enter input data, or it may receive data from another input data source.

Output device 18 produces or generates output data. Output device 18 may include a display device, a set of audio speakers, a printer, a port (for example a USB port), a peripheral component adaptor, a data transmitter or antenna such as a modem or wireless network adaptor, etc.

The storage device 24 can include any form of data or information storage means, for example, volatile or non-volatile memory, solid state storage devices, magnetic devices, etc. A file system and files may be stored on the storage device 24.

The communications port 20 allows the processing system 10 to communicate with other devices via a hard wired or wireless network. The interface 22 couples the processing system 10 to one or more peripheral devices. For example interface 22 may include a PCI card or PC card.

The processing system 10 may be any form of terminal, server processing system, specialised hardware, computer, computer system or computerised device, personal computer (PC), mobile or cellular telephone, mobile data terminal, portable computer, Personal Digital Assistant (PDA), pager or any other similar type of device.

An image capture device 30 in the form of a colour digital camera is also shown in FIG. 1. The camera 30 may communicate with the processing system 10 via a physical or wireless interface 32.

Figure 2:
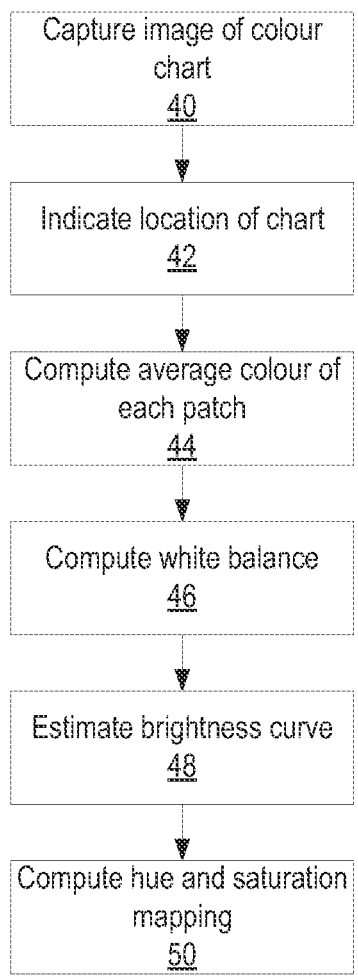
FIG. 2 is a flow chart illustrating a method for computing a mapping from apparent colour to actual colour.

A method for producing a mapping from apparent colour to actual colour may be executed on processor 12 using software stored in the memory 14. With reference to FIG. 2, at step 40, an image of a reference colour chart is captured. The chart may be a standard "gretagmacbeth ColorChecker™ Color Rendition Chart", which has 24 colour patches, each of which has an associated reference red, green and blue channel value. The image may be captured by activating the camera manually or via electronic signals sent using the software. The data captured by the camera sensors is transmitted via the interface 32 to the processing system 10, with colour calibration disabled.

At step 42, the user indicates the location of each colour patch in the reference colour chart. For example, the software could cause a GUI to display a preview of the image from the camera 30, and the user may click in the four corner squares of the chart in a specific order to enable the locations of the colour patches to be determined. In other alternatives, the location of the patches may be determined using machine vision techniques or by the placing of the reference colour chart in a specific known location that is a fixed distance from the camera.

The average colour of each location is captured in a 21×21 pixel window and used for the patch colour at step 44. Of course, it will be appreciated that different sized pixel windows could be used to compute the average colour.

At step 46, the white balance is computed from a single patch—namely the third darkest grey patch in the reference colour chart. It is assumed that the R, G and B values are equal in this neutral grey patch. The white balance is represented as:

$$\begin{bmatrix} r' \\ g' \\ b' \end{bmatrix} = \begin{bmatrix} w_r r \\ g \\ w_b b \end{bmatrix}$$

where $w_g$ is implicitly defined as one. The weightings $w_r$ and $w_b$ are calculated to produce r' and b' values equal to the g' value. The computed white balance values $W=[w_r, 1, w_b]$ will be used to correct the white balance of images captured by the camera.

Figure 3:
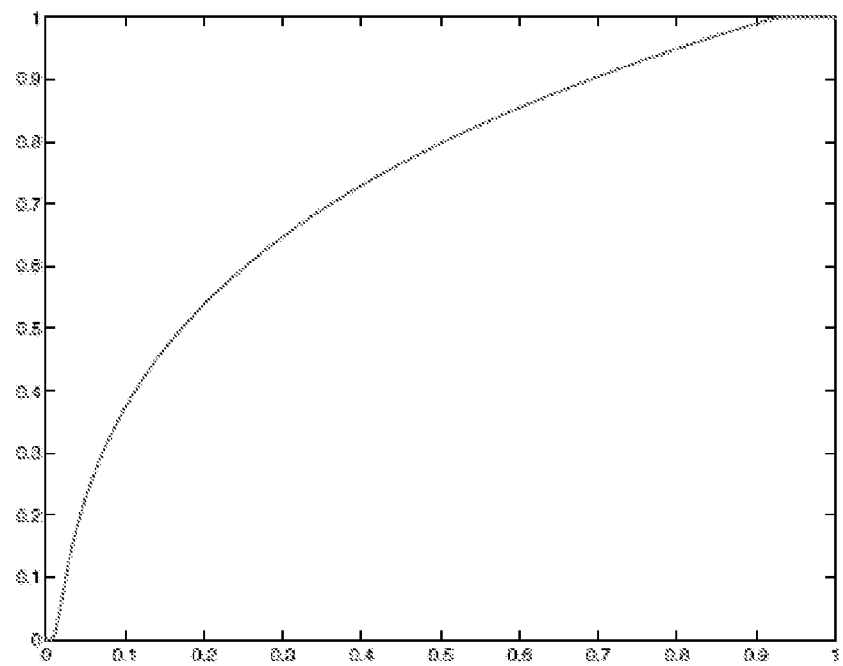
FIG. 3 is a graph showing an example curve for correcting the brightness of a captured image.

Once the white balance has been computed, at step 48, a curve C is computed which maps the apparent grey colour values together as well as possible. This provides a brightness mapping for the camera. The form of the curve is: $g'=ag^b+c$ where g is the input colour, g' is the output and a, b and c are the parameters of the curve C that are computed. FIG. 3 shows an example curve obtained from this process. Once estimated, the curve may be applied independently per colour channel. The final stage of the colour mapping function (step 50) aims to produce a mapping for the hue and saturation of each pixel.

The apparent hue and saturation of a plurality of the colour patches is measured, based on the white balance and colour corrected image and a hue and saturation mapping is computed at step 50. The hue mapping is provided using a series of control points to map the apparent hue values to actual hue values. It uses cubic interpolation (or another higher order interpolation method) to achieve this. Each control point consists of a position in a circular hue space, which is fixed, and an angular offset, which is computed during optimisation. The offset is cubically interpolated to provide an offset for a particular hue value that will map the particular hue value to an actual hue.

The saturation mapping function uses a series of control points to scale saturation values. These control points may be the same or different from the control points used to map the hue values. The saturation mapping function may use the same interpolation scheme as the hue mapping function. Note that saturation must be in the range [0, 1] and hence the output value from this function is clamped to ensure this range is enforced. In an alternative, the saturation mapping may be done via a curve similar to that applied for brightness correction.

Figure 4:
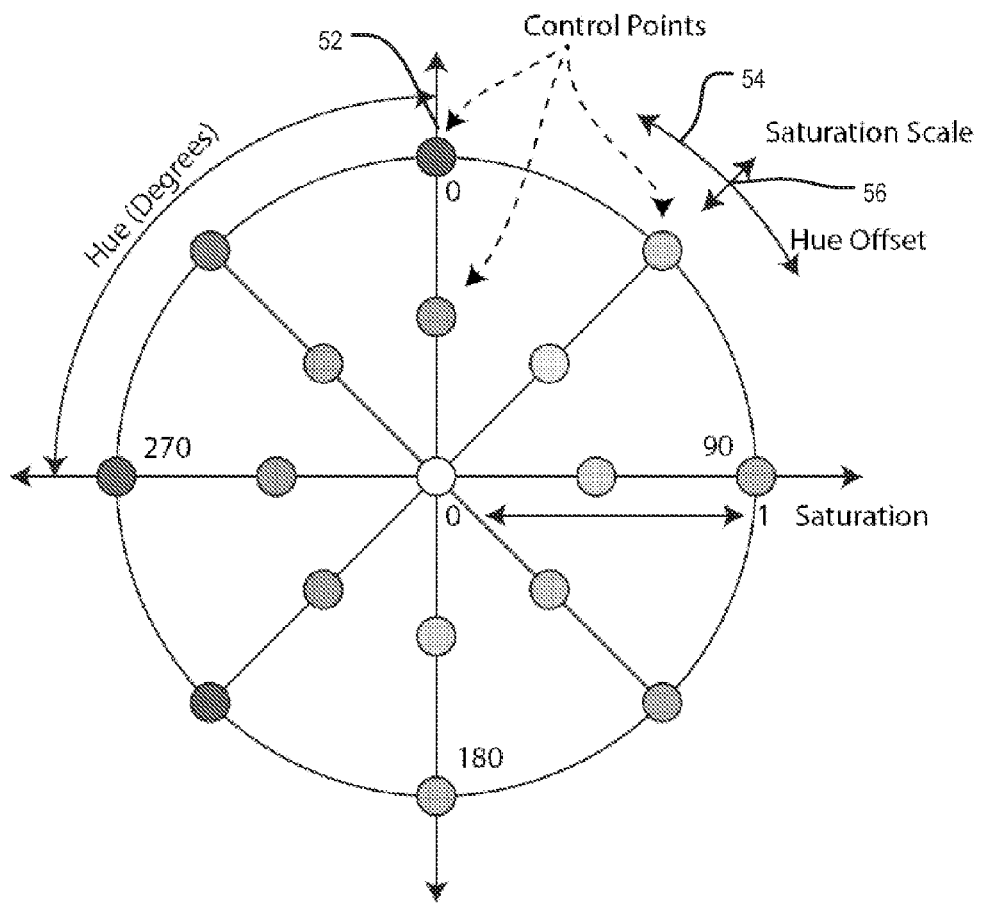
FIG. 4 is a diagram of a HSV space showing a plurality of control points within a circular hue space.

The control points used in the hue and saturation mapping functions may be spread evenly around the edge of the circular hue space as shown in FIG. 4. This circular hue space includes 16 control points, represented by coloured circles (for example, control point 52). For example, the coloured circle at hue of 0 degrees and saturation of 1 may be red, at hue of 90 degrees and saturation of 1 may be green, at hue of 180 degrees and saturation of 1 may be blue and at hue of 270 degrees and saturation of 1 may be purple. The direction of angular offset 54 and scale 56 is also shown in FIG. 4. The angular position of the control points are defined by their hue value and the radial position of the control points are defined by their saturation. Two rings of control points are shown, an inner ring having saturation of 0.5 and an outer ring having saturation of 1. In the case of a single ring of control points, only a single value is required to select the appropriate point, the value corresponding to hue. Hue is expressed as an angle and the function must take account of this when selecting control points.

The maximum number of control points is defined by the number of colour samples available. Each control point has two parameters, and each sample provides three residuals. Hence, n colour samples can have at most 3n/2 control points. In practice, however, the measurement process induces errors in the colour measurements.

Selecting the control points may include computing an error for a series of candidate mappings using different numbers of control points, and selecting a mapping from the series based on the minimal number of points yielding an acceptable error. It has been found that 12 control points are sufficient for a chart with 24 patches.

Since the brightness curve has already been estimated, it is assumed that the brightness values are correct; hence they need not be adjusted.

The angular offsets and scales are optimised to best map the apparent colours of patches from the image onto the actual colours of the equivalent colour patches in the reference colour chart. This is done by calculating a mapping f (p), such that the distance between the true and mapped colours is minimised:

$$\epsilon = \sum_i \|p_i - f(\hat{p}_i)\|^2$$

where $p_i$ is a true colour and $\hat{p}_i$ is a measured colour. The colour may be represented in any colour space, for example RGB, YUV, LAB or XYZ.

Note that hue is expressed as an angle and the function must take account of this when selecting control points. This is done by using a cost function. The cost function includes terms which ensure the scales maintain a value around one and the offsets around zero to prevent very large changes (such as offsets of 360)°. Given the following error measure:

$$\epsilon = [p_1 - f(\hat{p}_1), \ldots, p_N - f(\hat{p}_N), \delta_1, \ldots, \delta_M, 1-s_1, \ldots, 1-s_M]$$

where $\delta_i$ is the offset for the control point and $s_i$ is the scale for control point. It is sought to select $\delta_i$ and $s_i$ to minimise $\epsilon$ ie $$\mathrm{argmin}_{\delta_1, \ldots, \delta_M, s_1, \ldots, s_M} \|\epsilon\|^2$$

A solution to this may be obtained using the Levenberg-Marquardt algorithm, though any other unconstrained minimiser would also suffice. The cost function tries to minimise the error in mapping the colours together, while keeping the hue offsets near zero and the saturation scales near one.

Thus, what is involved is determining an angular offset 54 and scale 56 for each control point that minimises the sum of squares of the distance between a transformed apparent colour (e.g. RGB) and the reference colour (e.g. RGB) for each patch, minimises the angular offset and keeps the scale close to one (minimises 1 minus the scale).

Figure 5:
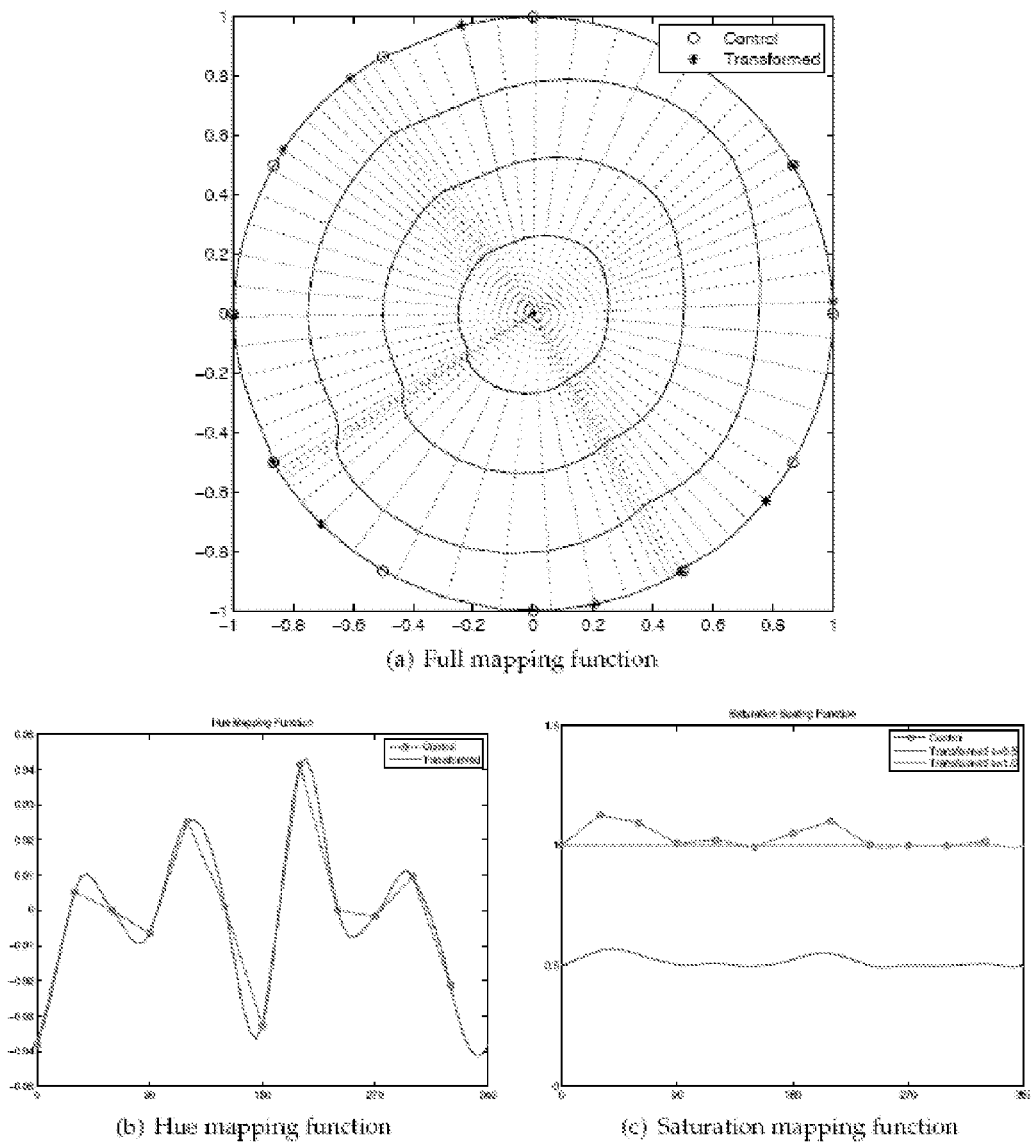
FIG. 5 is a graphical representation of (a) the mapping across the hue/saturation space, (b) the isolated hue mapping function and (c) the isolated saturation mapping function for a particular image capture device.
Figure 6:
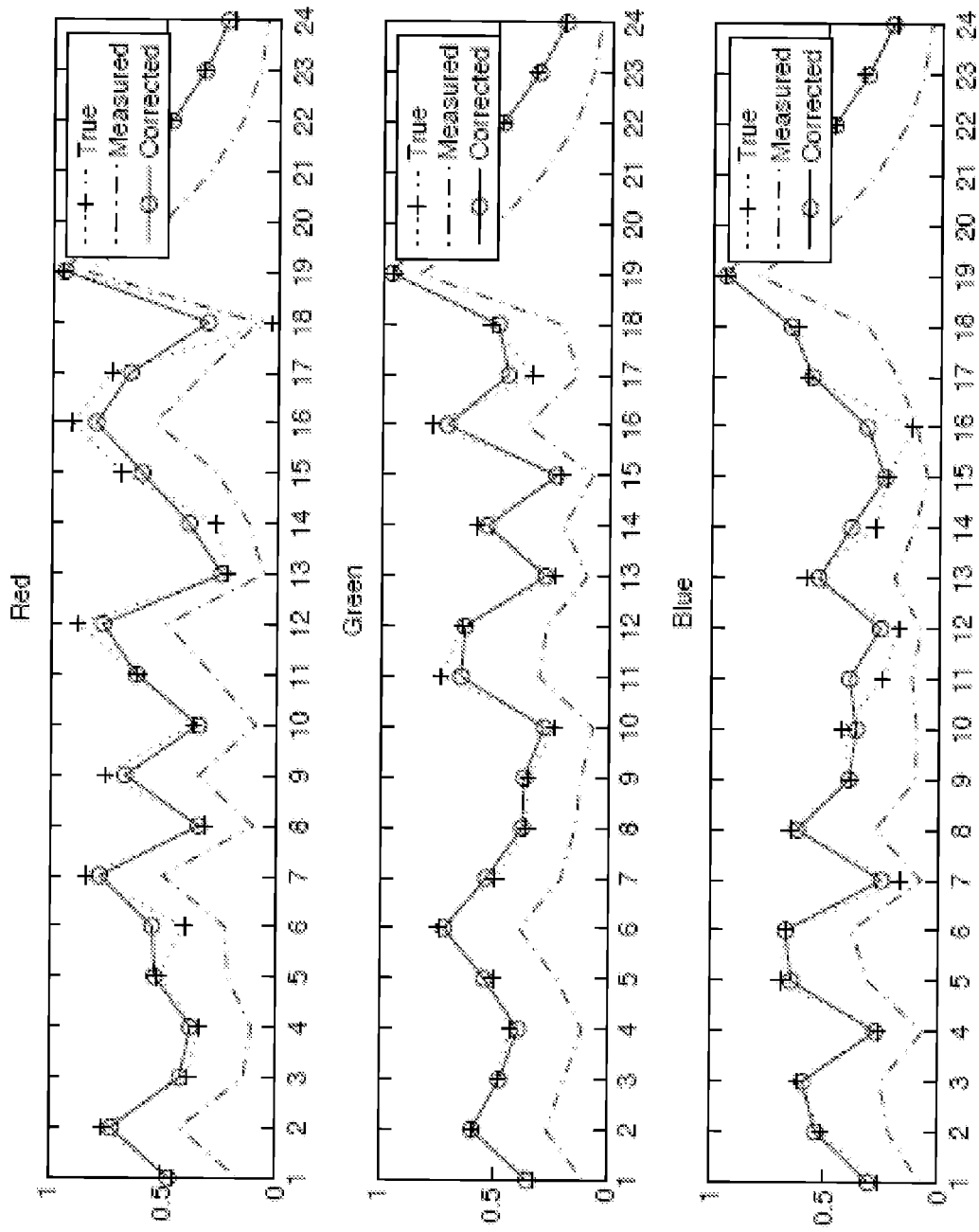
FIG. 6 is a graph showing the accuracy of the mapping.
Figure 7:
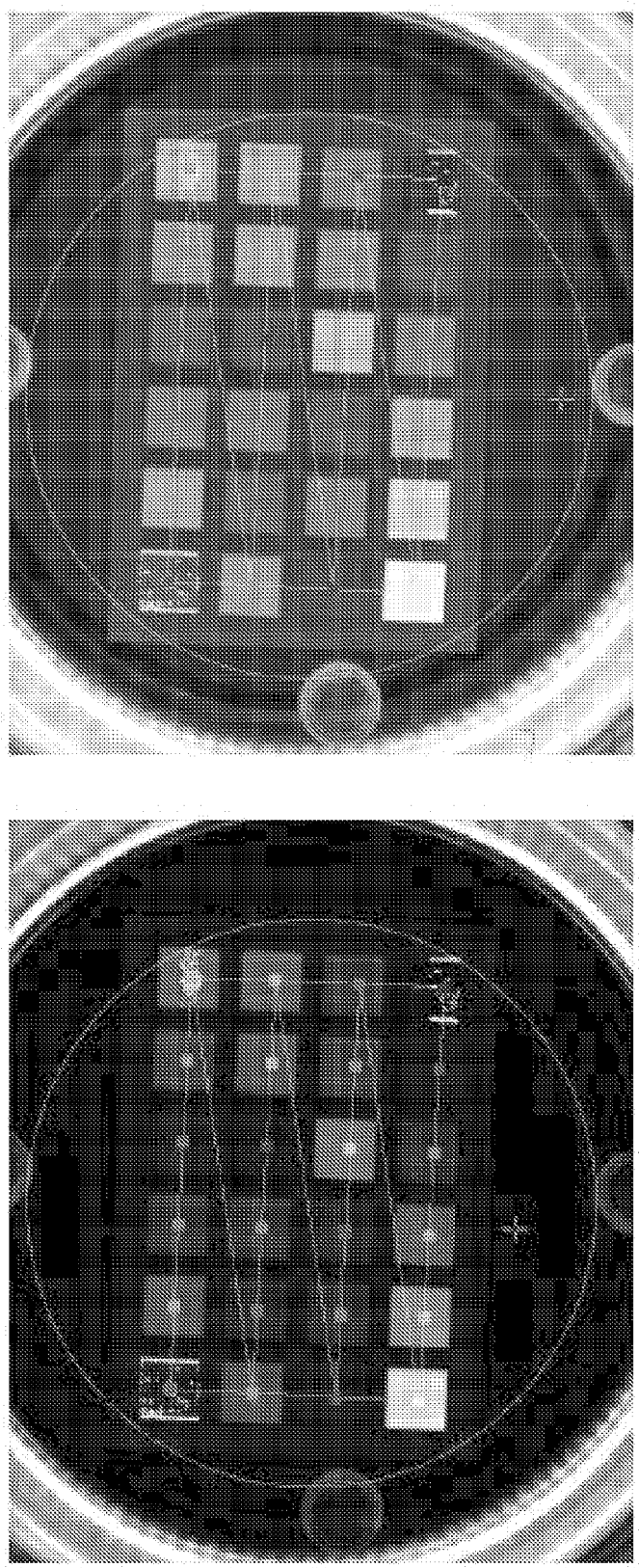
FIG. 7 is two photos of a colour chart (a) before colour calibration and (b) after colour calibration.

The result is a mapping in the form of angular offsets and/or scales for the control points. FIG. 5 shows a graphical representation of (a) the mapping across the hue/saturation space, (b) the isolated hue mapping function and (c) the isolated saturation mapping function for a particular camera. FIG. 6 provides some details on the accuracy of the mapping. Each position on the y-axis represents one of the 24 colour patches and the x-axis represents the colour values, where each can be between zero and one. An example of colour correcting an image using the mapping is shown in FIG. 7. The first image (a) shows the input image, as captured by the camera, after the user has selected the position of the colour patches. Note that in this example, the white balance is already roughly correct. The second image (b) shows the corrected colours. The small coloured squares visible over the patches show the true colour of each patch.

Figure 8:
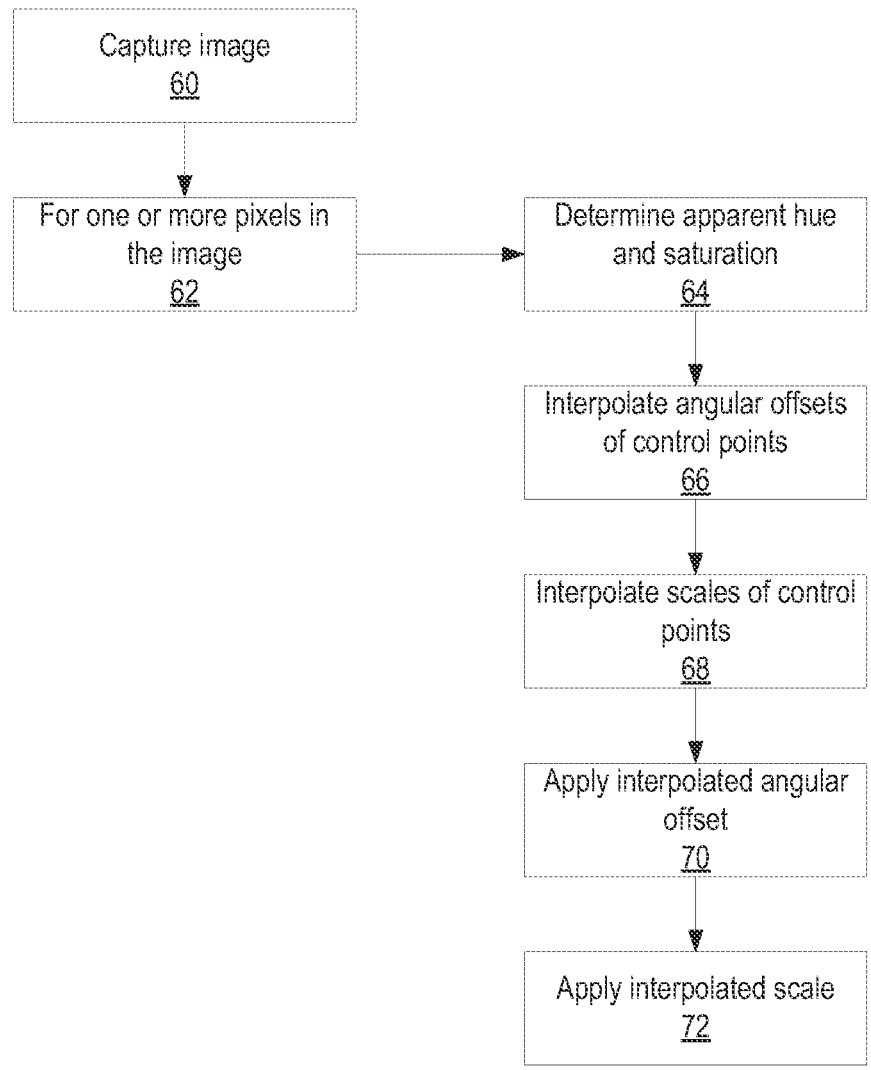
FIG. 8 is a flow chart illustrating a method for mapping an apparent colour to an actual colour.

This mapping can then be used to colour correct an image captured using the same (or the same type of) image capture device. With reference to FIG. 8, a method for mapping an apparent colour to an actual colour includes at step 60 capturing an image using the camera. The apparent RGB colour values for each pixel may be determined and the colour values may be white balance and brightness corrected using the weights/curve previously computed. The method then involves at step 62 for one or more pixels in the image, determining the apparent hue and saturation of the pixel (step 64), interpolating between the angular offsets of two or more control points in the circular hue space to determine an angular offset associated with the apparent hue (step 66), interpolating between the scales of the two or more control points in the circular hue space to determine a scale associated with the apparent saturation (step 68), applying the angular offset to the apparent hue (step 70), and applying the scale to the apparent saturation (step 72). Once the mapping has been applied, the HSV space colour can be transformed back into the RGB space, or to any other output space as desired.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A method for providing a mapping from apparent colour to actual colour for an image capture device, including:

capturing an image of a reference colour chart having a plurality of colour patches using the image capture device, wherein each colour patch has an associated reference colour, measuring, using a processor, the apparent colour of the plurality of colour patches in the captured image, selecting, using the processor, a plurality of control points representing different hue values within a circular hue space, determining, using the processor, an angular offset for each control point such that the distance between a transformed apparent colour and the reference colour for each colour patch is minimised, the angular offset representing a hue correction, wherein interpolation of the angular offsets for the control points provides a mapping from apparent colour to actual colour for the image capture device.

2. A method according to claim 1, wherein the plurality of control points are evenly spaced around the circular hue space.

3. A method according to claim 1, wherein selecting the plurality of control points includes:
computing an error for a series of candidate mappings using different numbers of control points, and
selecting a mapping from the series based on the minimal number of points yielding an acceptable error.

4. A method according to claim 1, wherein measuring the apparent colour of a colour patch includes:
measuring a colour of a colour patch,
white balance correcting the measured colour,
brightness correcting the measured colour, and
determining the apparent colour using the resulting white balance and brightness corrected colour.

5. A method according to claim 1, wherein determining the angular offset for each control point such that the distance between a transformed apparent colour and the reference colour for each colour patch is minimised includes:
minimising a cost function that includes the sum of the squares of the distance between the transformed apparent colour and the reference colour for each colour patch.

6. A method according to claim 5, wherein the cost function further includes the sum of the squares of the angular offsets.

7. A method according to claim 1, further including:
determining a scale for each control point such that the distance between a transformed apparent colour and the reference colour for each colour patch is minimised, the scale representing a saturation correction,
wherein interpolation of the scales for the control points provides a further mapping from apparent colour to actual colour for the image capture device.

8. A method according to claim 7, further including minimising a cost function that includes the sum of the squares of the distance between the transformed apparent colour and the reference colour for each colour patch, and wherein the cost function further includes the sum of the squares of one minus each saturation.

9. A method according to claim 1, further including:
capturing an image using the image capture device,
for one or more pixels in the image:
determining an apparent hue of the pixel,
interpolating between the angular offsets of two or more control points in the circular hue space to determine an angular offset associated with the apparent hue, and
applying the angular offset to the apparent hue.

10. A method according to claim 9, further including:
determining a scale for each control point such that the distance between a transformed apparent colour and the reference colour for each colour patch is minimised, the scale representing a saturation correction,
wherein interpolation of the scales for the control points provides a further mapping from apparent colour to actual colour for the image capture device.

11. A method according to claim 10, further including:
for the one or more pixels in the image:
determining an apparent saturation of the pixel,
interpolating between the scales of the two or more control points in the circular hue space to determine a scale associated with the apparent saturation, and
applying the scale to the apparent saturation.

12. A non-transitory computer readable media including software for use with a computer including a processor and memory for storing the software, the software including a series of instructions executable by the processor to carry out a method for providing a mapping from apparent colour to actual colour for an image capture device, the method including:
capturing an image of a reference colour chart having a plurality of colour patches using the image capture device, wherein each colour patch has an associated reference colour,
measuring the apparent colour of the plurality of colour patches in the captured image,
selecting a plurality of control points representing different hue values within a circular hue space,
determining an angular offset for each control point such that the distance between a transformed apparent colour and the reference colour for each colour patch is minimised, the angular offset representing a hue correction,
wherein interpolation of the angular offsets for the control points provides a mapping from apparent colour to actual colour for the image capture device.

13. Apparatus including
a processor;
a memory; and
software resident in the memory accessible to the processor, the software including a series of instructions executable by the processor to carry out a method for providing a mapping from apparent colour to actual colour for an image capture device, the method including:
capturing an image of a reference colour chart having a plurality of colour patches using the image capture device, wherein each colour patch has an associated reference colour,
measuring the apparent colour of the plurality of colour patches in the captured image,
selecting a plurality of control points representing different hue values within a circular hue space,
determining an angular offset for each control point such that the distance between a transformed apparent colour and the reference colour for each colour patch is minimised, the angular offset representing a hue correction,
wherein interpolation of the angular offsets for the control points provides a mapping from apparent colour to actual colour for the image capture device.

* * * * *